Dec. 5, 1961 W. S. PEPPLER, JR., ET AL 3,011,546
MULTI-LAYER PULP MOLDING
Filed April 16, 1958

INVENTORS
William S. Peppler, Jr.
James E. Foote.
BY Karl W. Flocks
ATTORNEY

3,011,546
MULTI-LAYER PULP MOLDING
William S. Peppler, Jr., Chappaqua, N.Y., and James E. Foote, Westport, Conn., assignors to Diamond National Corporation, a corporation of Delaware
Filed Apr. 16, 1958, Ser. No. 728,986
8 Claims. (Cl. 162—390)

The present invention relates to an apparatus for making multi-layer or laminated molded pulp articles, and more particularly to such an apparatus having tanks for molded pulp of variable volume.

In the art of making articles from molded pulp, it has long been a desideratum to make articles of two or more different pulp slurries, the article comprising laminations of the two or more slurries. Such an article would be less expensive, as it could be made of a base lamination of a cheaper slurry, and have thereon a surface or finish lamination of a more expensive slurry. Also, in certain types of articles, it may be desirable to put on different types of slurries for reasons of strength, coloring, appearance, etc.

In one known prior art attempt to provide an apparatus to accomplish the fabrication of articles from laminations of molded pulp, the individual layers were molded on separate screens, and then combined into the final article. This, of course, involved considerable transference of the individual layers. Others in the field have attempted to provide divided tanks through which the mold, fastened to a revolving drum, was passed; a key feature of such construction was the provision of a seal between the two compartments of the divided tank which more or less closely engaged the mold and permitted it to pass from one compartment to the other while permitting the passage of only a small amount of slurry from one compartment to the other. Such arrangements had the obvious disadvantage that the sealing means for the slurry compartment were subject to much wear, and hence did not prove suitable for high production machines; also, of course, this arrangement does not preclude intermingling of the slurries.

Another approach to the problem was to provide down-carrying forms above tanks, which were raised bodily to immerse the forms. Although this construction did prevent intermingling of the slurries, much expensive and complex equipment was necessary to raise the tanks, filled as they were with the heavy slurry, and the tanks could not be raised rapidly. Hence, this was not a solution of the problem of fast production without the intermingling of the slurries.

It is an object of the present invention to provide an apparatus for forming articles of layers of molded pulp suitable for high production use.

It is a further object of the present invention to provide an apparatus for making articles of laminations of molded pulp in which the types of molded pulp are separately held, and in which the batches of pulp are kept separate from each other.

It is yet another object of the present invention to provide a machine for making articles of laminated molded pulp in which pulp slurries of different types are separately kept, and in which the slurries are prevented from intermingling even after extensive use of the apparatus.

It is yet another object of the present invention to provide a machine for making articles of laminations of molded pulp in which separate slurries of molded pulp are caused to successively immerse the molding screen in sealed-off chambers.

A still further object of the present invention is the provision of a machine for molding articles of layers of pulp in which the molding screens are caused to enter chambers comprising tanks of variable volume.

Other objects and the nature and advantages of the instant invention will be apparent from the following description taken in conjunction with the accompanying drawings, wherein.

Figure 1:
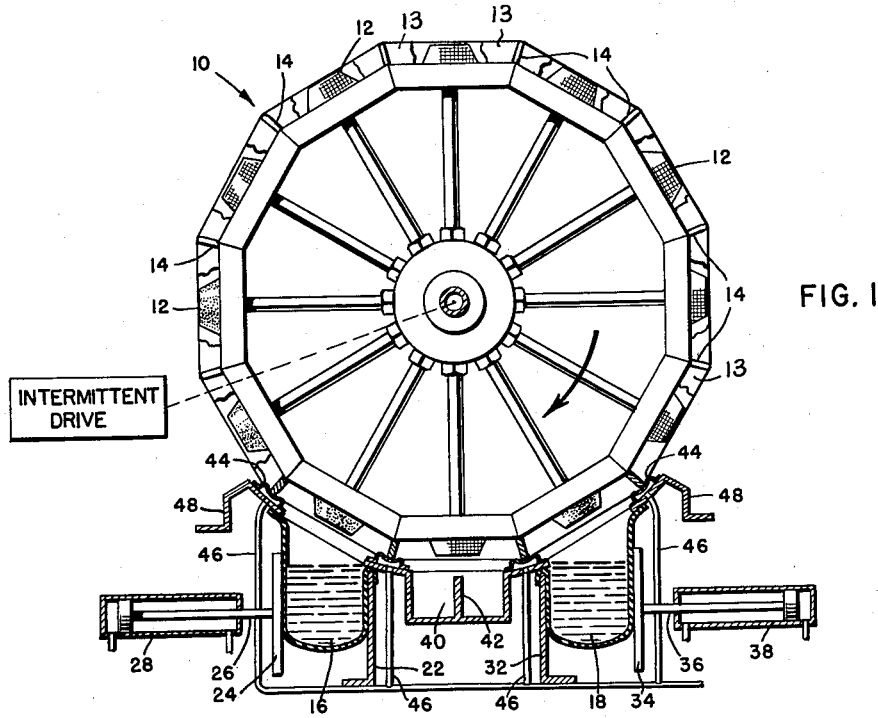
FIG. 1 is a view, partly schematic, of an apparatus in accordance with the present invention.

Referring now to the drawings, wherein like reference characters are used to designate like or corresponding parts throughout the several views, there is shown in FIG. 1 a revolving molding drum 10 having a plurality of molding screens 12 at spaced peripheral positions thereon. Adjacent the screens 12 are side plates 13, and between the molding screens 12 there are radially extending divider plates 14, it being understood that molding screens 12 and divider plates 14 are placed alternately about the circumference of the molding drum 10. Each of the molding screens 12 is immersed in a plurality of pulp baths, and during this immersion the screens 12 have vacuum applied thereto in known fashion; the particular vacuum-applying means for the screens 12 forms no part of the present invention.

At the lower part of the drum 10 there may be seen the apparatus for immersing the molding screens 12. There may be seen two tanks 16 and 18, these tanks in which the level of the pulp slurry can be raised while leaving the volume of the slurry unchanged. Tanks 16 and 18 are preferably constructed of a flexible material, such as rubber. On one side of tank 16 is a fixed abutment plate 22 and on the other side thereof is a movable plate 24 carried by the piston rod 26 of a jack 28. Similarly, on one side of the tank 18 is a fixed abutment plate 32 and on the other side is a movable plate 34 carried by the piston rod 36 of a jack 38. It will be understood that suitable fluid fittings, lines and pressure sources, all as known in the prior art, are connected with the jacks 28 and 38. Between the fixed abutment plates 22 and 32 there is positioned a receptacle 40 having a divider strip 42 therein. A flexible, inflatable seal 44 extends between the abutment plate 22 and the adjacent upper edge of the side of receptacle 40; a similar seal 44 extends between the fixed abutment plate 32 and the upper edge of the side of receptacle 40 adjacent thereto. Seals 44 are also provided on the upper edges of the tanks 16 and 18, as shown.

Figure 2:
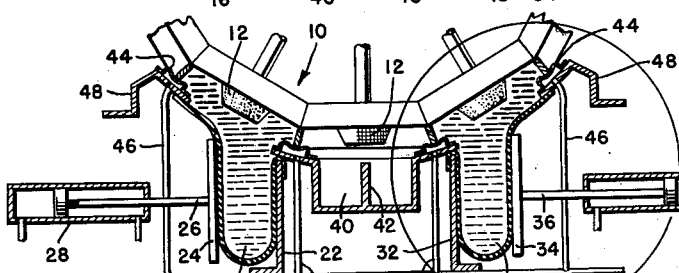
FIG. 2 is a view of the apparatus of FIG. 1, with parts removed, showing the parts in screen-immersing position.

In FIG. 2, it may be seen that the jacks 28 and 38 have been actuated to diminish the volume of the variable volume tanks 16 and 18, this action forcing the pulp in each of the tanks 16 and 18 upwardly and thus immersing the two molding screens 12 poistioned within the compartments defined by the periphery of the molding drum 10, the two adjacent divider plates 14, the two seals 44 with which the divider plates 14 engage and the walls of the variable volume tanks 16, 18.

Figures 3, 4, 5:
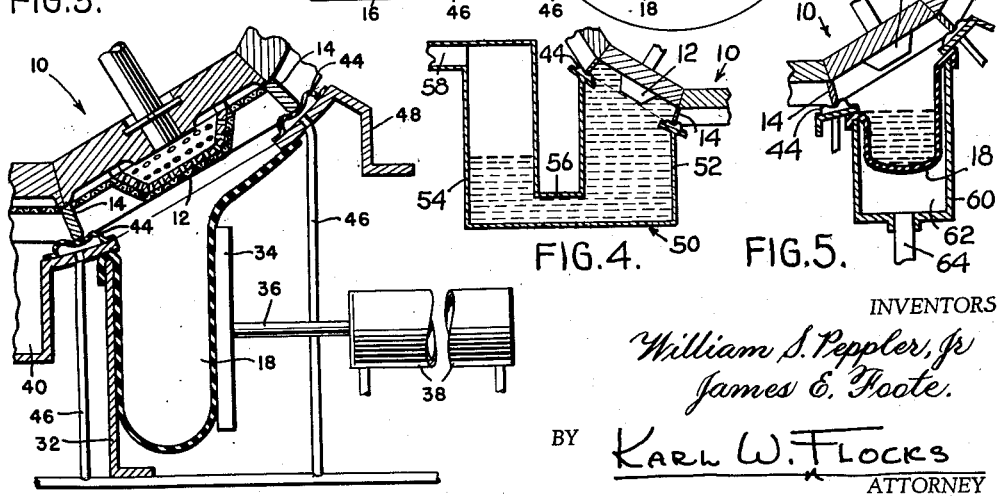
FIG. 3 is a view of that portion of FIG. 2 which is circled, to a greatly enlarged scale.
FIG. 4 is a view similar to FIG. 3 and showing another embodiment of the invention.
FIG. 5 is a view showing still another embodiment of the invention.

In FIG. 3 there may be seen the seal 44 in engagement with the divider plate 14. Seal 44 is preferably a hollow inflatable member having a conduit 46 connected with the interior thereof and with a suitable source of fluid under pressure. Seal 44 is preferably attached to a mounting structure 48, of any convenient form. Mounting structure 48 is attached to the main frame of the machine, and is thus fixed with relation to the main frame.

In operation, it may be assumed that the drum 10 revolves in a clockwise manner. One of the molding screens 12 will be over the tank 16, and another of the molding screens 12 will be over the receptacle 40; the initial article on each of these screens will contain only one lamination, that from the pulp in tank 16, and these articles thus will be discarded. However, the screen 12 that is in the compartment partially defined by the tank 18 will be immersed by the pulp in tank 18 when jack 38 is actuated to drive the plate 34 towards the fixed plate 32 to decrease the volume in the tank 18. It will be understood that prior to the time, or concurrently therewith, that the jack 38 is actuated, the seals 44 will be expanded by fluid entering therein through the conduit 46. As the pulp surface rises in the tank 18 upon movement of the plate 34, the air above the surface of the pulp will be permitted to exhaust through the molding screen 12.

A vacuum will be applied to the molding screen 12 in known fashion to cause adherence thereto of a layer of pulp from that which is in the tank 18. After a suitable length of time, which may be short, the jack 38 is returned to the position shown in FIG. 1, thus causing the level of the liquid in tank 18 to descend; at the same time the seals 44 may be permitted to deflate by decreasing the pressure therein to admit air into the compartment. Drum 10 will then be revolved one step so that the molding screen 12 which was immersed by the liquid pulp in tank 18 is placed over the receptacle 40. A slight amount of drying of the layer of pulp on that particular screen 12 may take place over the receptacle 40. On the next step of the drum 10, the particular molding screen 12 will be in position in the compartment which comprises the tank 16. The seals 44 and the jack 28 will be actuated as described in connection with tank 18, and the screen 12 will be immersed in the liquid pulp of the tank 16 to receive its second lamination.

It will be understood that once the apparatus of the present invention is put in operation, all of the operations will be useful except the first two steps of the drum 10, as above noted. It will be apparent, therefore, that there has been provided a machine which causes the successive deposition of laminations on a molding screen.

It will be further understood that the level of the liquid pulp in the tanks 16 and 18 will be maintained within the proper limits when the jacks 28 and 38 are in the position shown in FIG. 1 by means of any suitable apparatus, such as a float valve.

In FIG. 4, the construction of another embodiment of the invention is shown and there may be seen a tank 50 having a first compartment 52 that has rigid walls and corresponds in function to the tank 18. A second compartment 54 communicates with compartment 52 by a duct 56; compartment 54 also has a gas (air) supply duct 58 connected to the upper end thereof.

It will be understood that when a layer of pulp is to be molded onto the screen 12, air under pressure is introduced through the duct 58, and this forces some slurry from compartment 54 through duct 56 into compartment 52, so that the screen 12 is immersed. Upon completion of the molding, the air pressure is released and the liquid slurry will seek its level in the compartments 52 and 54 in known fashion.

In FIG. 5, there is shown a tank 18 of flexible material that has its outside encased in a jacket 60, an air space 62 thereby being provided. An air duct 64 communicates with the space 62.

As will be understood, when air under pressure is supplied to space 62 through duct 64, the tank 18 will be squeezed upwardly to raise the level of the slurry and immerse the mold 12, the volume of the tank being decreased.

While the invention has been described and shown as a vertical drum revolving on a horizontal axis, it will be understood by those skilled in the art that the invention also contemplates a drum placed horizontally and revolving about a vertical axis.

It will be obvious to those skilled in the art that various changes may be made without departing from the spirit of the invention and therefore the invention is not limited to what is shown in the drawings and described in the specification but only as indicated in the appended claims.

What is claimed is:

1. In an apparatus for forming laminated molded pulp articles, a drum, a plurality of molding screens on the periphery of said drum, radially outwardly extending peripherally spaced divider plates on said drum between adjacent molding screens, a tank fixedly mounted adjacent the periphery of said drum, seal means adjacent the upper margins of said tank mounted for engagement with divider plates adjacent a molding screen in registry with said tank, means for raising the level of liquid in said tank from a level below said molding screen to a level to immerse said molding screen, means for inflating and deflating said seal means, said tank having at least one portion thereof flexible, and said means for raising the liquid level therein comprising means to move said flexible portion.

2. The apparatus of claim 1, said last mentioned means comprising a jack, said jack having a plate on the piston rod thereof, said plate engaging said flexible member of said tank to decrease the volume thereof upon actuation of said jack.

3. The apparatus of claim 2, and further comprising fixed abutment plates in opposing relationship to said movable plates.

4. Apparatus for molding articles of laminations of pulp comprising a molding screen, means supporting said molding screen for movement along a defined path, a plurality of compartments contiguous with at least a portion of said path and each comprising a variable volume tank having at least a portion thereof of flexible material, and means for moving said flexible portions to decrease the volume of said tanks to raise the level of a liquid therein and thereby immerse a said molding screen in juxtaposition with a said compartment.

5. The apparatus of claim 4, said last mentioned means comprising a jack.

6. In apparatus for forming laminated molded pulp articles comprising a plurality of molds, means for supporting and moving said molds through a defined path and tank means for holding pulp slurries, the improvement comprising a plurality of open-ended tank means fixedly mounted relative to the path of movement of the molds with the open ends thereof adjacent the path of movement of said molds, means for intermittently moving said molds and for stopping each said mold in juxtaposition with the open end of each said tank means, means for effecting a seal about each said mold with the open end of each said tank means, and means for raising the level of slurry in each said tank means while leaving the volume of slurry in said tank unchanged when a said mold is in juxtaposition with the open end of said tank means to thereby immerse each said mold successively in the slurry in each said tank means whereby the molds may be successively immersed in the several slurries without intermixing of any of said slurries.

7. The apparatus of claim 6, said molds having divider plates extending therebetween generally transversely of the path of movement thereof, and said tank means including seal means at the open ends thereof positioned for cooperative engagement with said divider plates.

8. The apparatus of claim 7, said seal means being inflatable.

References Cited in the file of this patent
UNITED STATES PATENTS

| | | |
|---|---|---|
| 142,728 | Reagan | Sept. 9, 1873 |
| 868,996 | Komp | Oct. 22, 1907 |
| 1,707,429 | Chaplin | Apr. 2, 1929 |
| 1,730,450 | Chaplin | Oct. 8, 1929 |
| 2,234,979 | Randall et al. | Mar. 18, 1941 |
| 2,717,540 | Planer | Sept. 13, 1955 |